United States Patent [19]

Schiller et al.

[11] 3,912,688

[45] Oct. 14, 1975

[54] FLAMEPROOF POLYCARBONATES

[75] Inventors: Paul Schiller, Krefeld-Verdingen; Ulrich Haberland; Hugo Vernaleken, both of Krefeld, all of Germany

[73] Assignee: Bayer Aktiengesellschaft, Leverkusen Bayerwerk, Germany

[22] Filed: Feb. 12, 1974

[21] Appl. No.: 441,777

Related U.S. Application Data

[63] Continuation of Ser. No. 261,202, June 9, 1972, abandoned.

[30] Foreign Application Priority Data

June 12, 1971 Germany.............................. 2129204

[52] U.S. Cl......... 260/49; 260/47 XA; 260/DIG. 24
[51] Int. Cl.²......................................... C08G 63/62
[58] Field of Search........... 260/49, 47 XA, DIG. 24

[56] References Cited

UNITED STATES PATENTS

| | | | |
|---|---|---|---|
| 3,271,364 | 9/1966 | Conix et al. .......................... | 260/47 |
| 3,271,367 | 9/1966 | Schnell et al. ........................ | 260/49 |
| 3,312,659 | 4/1967 | Kurkjy ................................. | 260/47 |
| 3,419,526 | 12/1968 | Schnell et al. ........................ | 260/49 |

*Primary Examiner*—Lester L. Lee
*Attorney, Agent, or Firm*—Lawrence S. Pope

[57] ABSTRACT

Copolycarbonates are provided which have improved flame resistance and a reduced tendency to drip when flamed based on aromatic dihydroxy compounds, characterized in that they contain, besides the carbonate carbonyl radical, radicals derived by the removal of the hydroxyl hydrogen atoms from dihydroxy-diaryl compounds, radicals derived by the removal of the hydroxyl hydrogen atoms from nuclear halogenated by-hydroxyaryl compounds and bivalent radicals derived by the removal of the hydroxyl hydrogen atoms from the bis-hydroxy-sulfones of the formula (1)

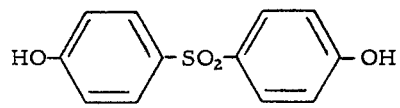

and/or of the formula (2)

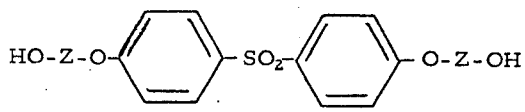

in which
Z is phenylene, diphenylene, naphthylene or a bivalent radical of formula (3)

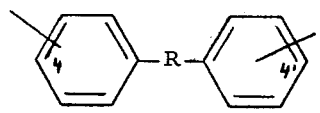

in which
R can be -O-, alkylene, alkylidene cycloalkylene, cycloalkylidene, $SO_2$, SO, S or >CO, the amount of the sulfone being 0.1 mol% to 10 mol%, preferably 0.5 mol% to 5 mol%, based on the total amount of the di- and bis-hydroxy-compounds mentioned above.

11 Claims, No Drawings

FLAMEPROOF POLYCARBONATES

This is a continuation of application Ser. No. 261,202, filed June 9, 1972, now abandoned.

The invention relates to halogen-containing flameproof polycarbonates which have improved burning properties due to the incorporation therein of diphenylsulphone and/or diphenylsulphonearyl ether structures.

While it is known that polycarbonates show improved burning properties when condensed with aromatic nuclear-halogenated bisphenols, such as e.g. tetrabromo- or tetrachlor-bisphenol A, it is also known that the amount of halogen-containing bisphenols to be incorporated by condensation must be limited or else the flameproof polycarbonates will have reduced mechanical properties.

In "Deutsche Offenlegungsschrift" (German published specification) No. 1,918,216, a method for preparing flameproof polycarbonates with improved burning properties and a low content of chlorine is described in which nickel salts are added to a halogen-containing polycarbonate. However, in order to achieve the high flame inhibition required by the UL test (Subj. 94) for the class SE O with nickel-containing polycarbonates, higher nickel concentrations or tetrachlorobisphenol contents are required in the copolycarbonates.

Especially in the case of prolonged hot storage or with high processing temperatures, these higher nickel concentrations cause an increasing discoloration while an increase of the tetrachloro-bisphenol content causes a reduction of the mechanical properties, especially the notch impact strength.

It is therefore an object of this invention to provide polycarbonates and a method for preparing them which are devoid of the foregoing disadvantages.

Another object of this invention is to provide substantially flame resistant polycarbonates which have a low tendency to drip when flamed and a method for preparing them.

A further object of this invention is to provide polycarbonates which do not discolor upon processing or heat storage and which the mechanical properties of which are not adversely affected.

The foregoing objects and others which will become apparent from the following description are accomplished in accordance with this invention, generally speaking, by providing copolycarbonates based on dihydroxydiaryl compounds and nuclear-halogenated bis-hydroxyaryls, especially on nuclear-halogenated bis-4-hydroxyaryl-alkanes which contain as structural features diphenyl-sulphone and/or diphenyl-sulphonediaryl ether segments of the formulae

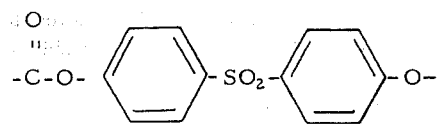

or

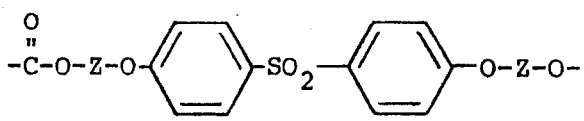

or mixtures thereof wherein

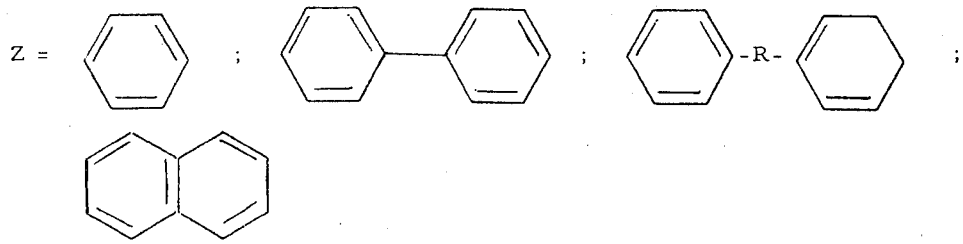

and R is O, alkylene, akylidene, cycloalkylene, cycloalkylidene, $SO_2$, S, C=O, or SO.

The copolycarbonates of this invention have improved flame resistance and a reduced tendency to drip when flamed and are based on aromatic dihydroxy compounds, characterized in that they contain, besides the carbonate carbonyl radicals, the radicals obtained by removing the hydroxyl hydrogen atoms from dihydroxydiaryl compounds, nuclear-halogenated bis-hydroxyaryl compounds and bivalent sulfones-containing compounds of the formula (1)

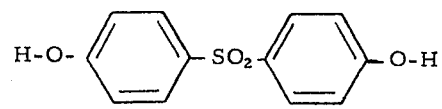

or of the formula (2)

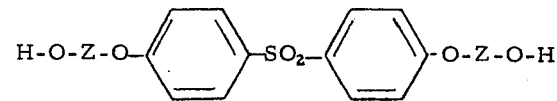

or mixtures thereof in which Z is phenylene, diphenylene, naphthylene or a bivalent radical of the formula (3)

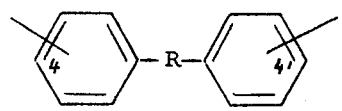

in which
R can be —O—, alkylene, alkylidene, cycloalkylene, cycloalkylidene, $SO_2$, SO, S or >CO, the amount of the sulfones of formulae (1) and/or (2) being from about 0.1 mol% to about 10 mol%, preferably 0.5 mol% to 5 mol%, based on the total amount of the di- and bishydroxyaryl compounds employed.

Preferred radicals for Z are 1.4-phenylene, 1.3-phenylene, 4.4'-diphenylene, 1.5-, 2.7-, 1.6- and 1.7-naphthylenes, and the bivalent radicals of the formula (3) linked via the 4.4'-positions; the alkylene and alkylidene radicals have preferably 1 – 6 carbon atoms, the cycloalkylene and cycloalkylidene have preferably 4 – 15 carbon atoms. The amount of the nuclear-halogenated bis-hydroxyaryl compounds is preferably 4–10 mol%, referred to tetra-nuclear-halogenated bis-hydroxylaryl compounds, e.g. 2.2-(tetrachloro4.4'-dihydroxydiphenyl)-propane and/or 2.2-(tetrabromo-4.4'-dihydroxydiphenyl)-propane, and based on the total amount of the di- and bis-hydroxyaryl compounds employed.

It has been found that copolycarbonates based on dihydroxydiaryl compounds and nuclear-halogenated bis-hydroxyaryl compounds with the same halogen content are more flameproof and, at the same time, have a substantially lower tendency to drip when 0.1 – 10 mol%, preferably 0.5 – 5 mol% dihydroxydiphenyl-sulphone and/or dihydroxy-diphenylsulphonediaryl ether are condensed with the dihydroxydiaryl and nuclear-halogenated bis-hydroxyaryl compounds and a carbonate precursor such as phosgene or a diaryl carbonate such as diphenyl carbonate when preparing these products. This is particularly surprising since copolycarbonates containing bisphenol A [2,2-(4,4'-dihydroxydiaryl)propane] and dihydroxydiarylsulphones in the same molar percentages and which have a sulphur content of from about 0.05% by weight to about 1% by weight tend to be more readily combustible than homopolycarbonates based on bisphenol A alone. Further, because polycarbonates having a low halogen content of, for example, 2.5% by weight to about 5% by weight chlorine do not meet the conditions of the class SE O in the UL test (Subj. 94), even with the addition of nickel salts mentioned above.

By using the sulfur containing compounds of this invention in the preparation of halogen-containing polycarbonates it is possible to obtain products which are as flame resistant as those with a higher halogen content but without the addition of these compounds.

The incorporation of dihydroxy-diphenylsulphone, particularly 4,4'-dihydroxydiphenyl sulfone is especially advantageous.

In the UL test (Subj. 94) the polycarbonates of this invention exhibit short after-burning times and do not drip; therefore they meet the conditions of class SE O whereas, for example, similar copolycarbonates which do not contain the sulfur containing compounds of this invention only meet the conditions of class SE II in the UL flame test.

The copolycarbonates of this invention have a very light color which is very stable even after prolonged tempering and after extrusion at temperatures above 330°C. Further, the mechanical properties of the copolycarbonates of this invention are not adversely affected and it is even possible to develop products with highly valuable mechanical properties since the content of the halogenated reactant and the amount of the sulphone can be kept low. Polycarbonates based on dihydroxyaryl compounds and nuclear-halogenated bis-hydroxyaryl and containing the sulphone or sulphone-aryl ether structures of this invention therefore constitute a substantial technical advance.

Any desired dihydroxydiaryl compound can be used in the production of the copolycarbonates of this invention such as, for example, bis-(4-hydroxyphenyl)-alkanes such as bis-(4-hydroxyphenyl)-methane, bis-2-(4-hydroxyphenyl)-propane, bis-2-(4-hydroxy-3,5-dimethylphenyl)propane and/or bis-1-(4-hydroxyphenyl)-cyclohexane and/or those of the type of "trinuclear bisphenol" such as p-di-[α-(4-hydroxyphenyl)isopropyl]-benzene. Besides the 4,4'-substituted aromatic dihydroxydiaryl compounds, the isomers thereof can also be used. Also, any of those compounds mentioned as suitable for the production of polycarbonates in U.S. Pat. Nos. 3,028,365; 2,999,846; 3,248,414; 3,153,008; 3,215,668; 3,187,065; 2,964,974; 2,970,137; 2,991,273; 2,999,835; 3,014,891; 3,030,331 and the like may also be used and mixtures thereof.

Any suitable nuclear-halogenated bis-hydroxyaryl starting components can be used such as, for example, halogen-containing bisphenols such as 2,2-(3,5,3',5'-tetrachloro-4,4'-dihydroxydiphenyl)-propane, 2,2-(3,5,3',5'-tetrabromo-4,4'-dihydroxydiphenyl)-propane, 2,2-(3,3'-dichloro-4,4'-dihydroxydiphenyl)-propane, 2,2-(3,5-dichloro-4,4'-dihydroxydiphenyl)-propane, 2,2-(3,3'-dichloro-5,5'-dimethyl-4,4'-dihydroxydiphenyl)-propane, 2,2-(3,3'-dibromo-4,4'-dihydroxydiphenyl)-propane, any of those listed in the patents cited herein or the corresponding nuclear-halogenated derivatives thereof and the like and mixtures thereof.

Any suitable flame-inhibiting, sulphur-containing starting components of synergistic effect and having formulae (1) and/or (2) can be used including, for example, 4,4'-dihydroxydiphenylsulphone, 4,4'-bis(p-hydroxyphenoxy)-diphenylsulphone, 4,4'-bis-(p-hydroxydiphenoxy)-diphenyl-sulphone, 4,4'-bis-[(4-hydroxy-phenoxy)-phenyl ether]-diphenylsulphone, 4,4'-bis-[4-(4-hydroxyphenylisopropyl)-phenoxy]-diphenylsulphone, and those mentioned additionally in U S. Pat. No. 3,579,591.

Any suitable processes, reactants, catalysts, solvents and conditions and the like for the production of the polycarbonates of this invention which have improved burning properties which are customarily employed in polycarbonate syntheses may be used although the phaseinterface condensation and the condensation in a homogeneous solvent phase as described in German Pat. Nos. 1,046,311 and 962,274 and any of the U.S. patents cited hereinbefore are preferred.

According to the phase-interface condensation processes, polycarbonates are obtained by reacting the alkali metal or alkaline earth metal salts of the dihydroxy compounds which are present in an aqueous solution or suspension and the sulfones of this invention either with a derivative of carbonic acid, such as e.g. phosgene (carbonyl chloride), carbonyl bromide, or with the bis-chloroformic acid ester of these aromatic dihydroxy compounds, a solvent which is inert to the reaction components, e.g. from the series of chlorinated hydrocarbons or aromatic hydrocarbons, being added to the reaction mixture to absorb the condensation product. In order to limit the molecular weight one may use monofunctional reactants such as monophenols, for example the propyl-, isopropyl- and butyl-phenols, especially p-tert.-butyl-phenol and phenol itself. In order to accelerate the reaction, catalysts such as tertiary amines, quaternary ammonium, phosphonium or arsonium salts and the like may be used. The reaction temperature should be about −20° to +150°C., preferably 0°C. to about 100°C.

According to the polycondensation process in a homogeneous phase, the dissolved reaction components are polycondensed in an inert solvent in the presence of the equivalent amount of a tertiary base required for absorption of the generated HCl, such as e.g. N,N-dimethyl-aniline, N,N-dimethyl-cyclohexylamine or, preferably, pyridine and the like.

It is to be understood that it is possible to combine in the processes described above in a chemically meaningful way the aromatic dihydroxy compounds, monohydroxy compounds in the form of the alkali metal salts and/or bis-haloformic acid esters, and the amount of phosgene or carbonyl bromide then still required in order to obtain high-molecular products. In order to obtain, for example, a copolycarbonate from 92 mol% bisphenol A, 6 mol% tetrachlorobisphenol, 2 mol% dihydroxydiphenylsulphone and molecular weight limiters according to one of the processes described above, many variations of the process are possible without affecting the properties of the product.

The dihydroxydiaryl compounds and the nuclear-halogenated bis-hydroxyaryls can be polycondensed in the usual mixing proportions as described in any of the patents cited herein, taking the mechanical properties of the polycarbonates to be produced into consideration. Copolycarbonates with the aforesaid good properties are obtained, for example, when a mixture of 80 – 96 mol% bis-2-(4-hydroxyphenyl)-propane and 4 – 10 mol% bis-2-(3,5-dichloro-4-hydroxyphenyl)-propane is polycondensed with 0.1 – 10 mol% 4,4'-dihydroxy-diphenylsulphone and phosgene, but preferably 85 – 95.5 mol% bis-2-(4-hydroxyphenyl)-propane, 4 – 10 mol% bis-2-(3,5-dichloro-4-hydroxyphenyl)-propane are polycondensed with 0.5 – 5 mol% 4,4'-dihydroxy-diphenyl-sulphone and phosgene using one of the processes mentioned above.

The copolycarbonates of this invention prepared as described herein can be isolated from solution by evaporation and extrusion of the polycondensation product or by precipitation with a suitable precipitating agent such as acetone, methanol or petroleum ether, and are used for the production of synthetic materials as are conventional polycarbonates but are particularly useful where flame resistant thermoplastic synthetic materials of high-quality mechanical properties is required, such as, for example, in the electrical field, in aircraft construction, for coverings of measuring instruments and lamps as well as for supporting parts in electrical installations.

The invention is further illustrated but is not intended to be limited by the following examples in which all parts and percentages are by weight unless otherwise specified.

EXAMPLE 1

A reaction vessel aerated with nitrogen is successively charged with 20 liters of distilled water, 3150 g of bis-2 -(4,4'-dihydroxydiphenyl)-proppane (13.8 mol), 330 g of bis-2-(3,5,3',5'-tetrachloro-4,4'-dihydroxydiphenyl)-propane (0.9 mol), 75 g of 4,4'-dihydroxy-diphenylsulphone (0.3 mol), 63 g of p-tert.-butylphenol (2.8 mol%), 1380 g of 45% NaOH (15.5 mol) and 35 liters of methylene chloride. The mixture is stirred until the phenols have dissolved, and 1800 g of $COCl_2$ (18.25 mol) are then introduced at 25° to 30°C. and at a pH of 11 to 12 within about 90 minutes. The pH valve is kept constant by the dropwise addition of an aqueous 45% NaOH solution. Consumption: 1600 ml of 45% NaOH. When the addition of phosgene is completed, a further 200 ml of aqueous 45% NaOH and 15 ml of TEA (triethylamine) (1 mol%) are added, and stirring is continued for about 1 hour at a pH of 13 in order to complete the polycondensation.

The organic phase containing the polycarbonate is separated and washed in succession with 2% NaOH, 2% phosphoric acid and finally with distilled water until electrolyte-free. The methylene chloride solution is then worked up by adding toluene and distilling off the methylene chloride. When the toluene solution cools down, it gels and is processed in a granulating machine to give a powder/granule mixture which is dried in a water jet vacuum at 120°C. for 48 hours.

The relative viscosity (0.5 g of product in 100 ml $CH_2Cl_2$, 25°C) amounts to 1.310.

EXAMPLES 2 AND 3

Copolycondensates are prepared as described in Example 1 except that no 4,4'-dihydroxydiphenyl sulfone was employed in their preparation and polycondensate 2 contains 6 mol percent of bis-2,2-(3,5,3',5'-tetrachloro-4,4'-dihydroxy diphenyl propane and polycondensate 3 contains 11 mol% of bis-2,2-(3,5,3',5'-tetrachloro-4,4'-dihydroxydiphenyl.

The relative viscosities, elongation, impact and burning data for these condensates is compared with those of Example 1 in the following table:

| Example | 1 | 2 | 3 |
|---|---|---|---|
| $\eta_{rel}$ granulate | 1.318 | 1.306 | 1.285 |
| elongation at break | 105% | 120% | 100% |
| standard notch impact strength cm.kp/sq.cm | 30.7 | 27.5 | 19.6 |
| burning properties acc. to UL Subj. 94 class | 0 | II | 0/I |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

EXAMPLE 4

According Example 1 a copolycondensate is prepared from 92 mol% bis-2 -(4.4'-dihydroxy-diphenyl)-propane, 6 mol% bis-2-(3.5.3'.5'-tetrachloro-4.4'-dihydroxydiphenyl)-propane and a) 2 mol% 4.4'-bis-(p-hydroxyphenoxy)-diphenylsulphone or b) 2 mol% 4.4'-bis[4-(4-hydroxyphenylisopropyl)-phenoxy]-diphenylsulphone. The copolycondensates 4a and 4b have improved burning data compared with the products obtained without the 2 mol% of the bis-hydroxysulfones.

What is claimed is:

1. Copolycarbonates prepared by a process comprising reacting a. a dihydroxydiaryl compound,
b. a nuclear-halogenated bishydroxyaryl compound, and
c. a bis-hydroxy sulfone of the formula

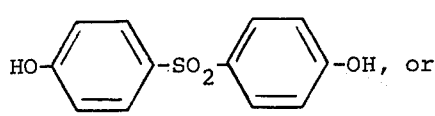

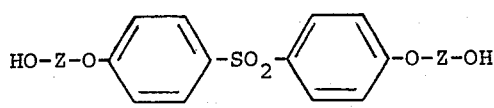

or mixtures thereof in which Z is phenylene, diphenylene, naphthylene or a bivalent radical of the formula

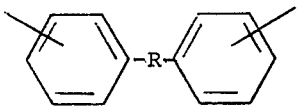

in which R is O, alkylene, alkylidene, cycloalkylene, cycloalkylidene, $SO_2$, SO, S or —CO,
with a carbonate precursor, selected from the group consisting of diarylcarbonates, phosgene, carbonyl bromide, bis-chloroformic acid esters of the aromatic dihydroxy compounds and mixtures of these precursors said polycarbonate containing from about 80–95.9 mol% of (a) from about 4–10 mol% of (b) and from about 0.1–10 mol% of (c).

2. The copolycarbonates of claim 1 wherein the sulfone is

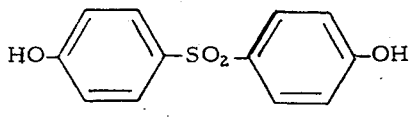

3. The copolycarbonates of claim 1 wherein the sulfone is

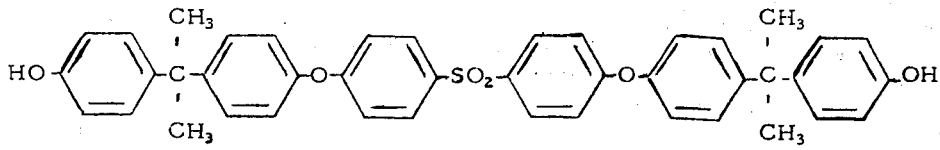

4. The copolycarbonates of claim 1 wherein the sulfone is

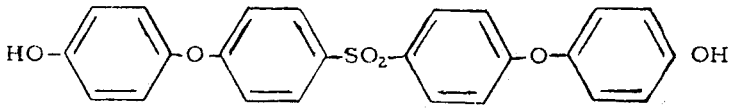

5. The copolycarbonates of claim 1 wherein the nuclear halogenated bishydroxyaryl compounds are 2.2-(3.5.3′.5′-tetrachloro-4.4′-dihydroxydiphenyl)-propane or 2.2-(3.5.3′.5′tetrabromo-4.4′-dihydroxydiphenyl)-propane or mixtures thereof in amounts between 4 mol% and 10 mol% referred to the total amount of the di- and bis-hydroxy compounds employed.

6. The copolycarbonates of claim 1, wherein the amount of the dihydroxydiaryl compound is from about 85–95.5 mol% and the amount of the sulfone is from about 0.5-5 mol%.

7. The copolycarbonates of claim 1 wherein the dihydroxydiaryl compound of bis-2-(4-hydroxyphenyl)-propane; the nuclear-halogenated bishydroxyaryl compound is bis-2-(3,5-dichloro-4-hydroxyphenyl)propane and the sulfone is 4,4′-dihydroxydiphenylsulfone.

8. The copolycarbonates of claim 1 wherein the dihydroxydiaryl compound is selected from the group consisting of bis-(4-hydroxyphenyl)-methane, bis-2-(4-hydroxyphenyl)-propane, bis-2-(4-hydroxy-3,5-dimethylphenyl)-propane, bis-1-(4-hydroxyphenyl)-cyclohexane, and p-di-[α-(4-hydroxyphenyl)-isopropyl]-benzene.

9. The copolycarbonates of claim 1 wherein the nuclear-halogenated bis-hydroxyaryl compound is selected from the group consisting of: 2,2-(3,5,3′,5′-tetrachloro-4,4′-dihydroxydiphenyl)-propane, 2,2-(3,5,3′,5′-tetrabromo-4,4′-dihydroxydiphenyl)-propane, 2,2-(3,3′-dichloro-4,4′-dihydroxydiphenyl)-propane, 2,2-(3,5-dichloro-4,4′-dihydroxydiphenyl)-propane, 2,2-(3,3′-dichloro-5,5′-dimethyl-4,4′-dihydroxydiphenyl)-propane and 2,2-(3,3′-dibromo-4,4′-dihydroxydiphenyl)propane.

10. The copolycarbonates of claim 1 wherein the bishydroxy sulfone is selected from the group consisting of: 4,4′-dihydroxydiphenyl-sulphone, 4,4′-bis-(p-hydroxyphenoxy)-diphenylsulphone, 4,4′-bis-(p-hydroxydiphenoxy)-diphenyl-sulfone, 4,4′-bis-[(4-hydroxy-phenoxy)-phenyl ether]-diphenylsulphone, and 4,4′-bis-[4-(4-hydroxyphenylisopropyl)-phenoxy]-diphenylsulphone.

11. The copolycarbonates of claim 1 wherein Z in the bis-hydroxy sulfone is 1,4-phenylene, 1,3-phenylene, 4,4′-diphenylene, 1,5-naphthylene, 2,7-naphthylene, 1,6-naphthylene or 1,7-naphthylene; the alkylene and alkylidene radicals have 1 to 6 carbon atoms; and the cycloalkylene and cycloalkylidene radicals have 4 to 15 carbon atoms.

* * * * *